United States Patent [19]

Jacques et al.

[11] Patent Number: 5,417,499
[45] Date of Patent: May 23, 1995

[54] FABRIC LINED BUSHING

[75] Inventors: William Jacques, Paris, Ill.; Frederick Jeffrey, Hillsdale, Ind.

[73] Assignee: Eagle-Picher Industries, Inc., Cincinnati, Ohio

[21] Appl. No.: 40,516

[22] Filed: Mar. 31, 1993

[51] Int. Cl.6 .................... F16C 33/18; F16C 33/20
[52] U.S. Cl. .................................. 384/298; 384/300
[58] Field of Search ............... 384/276, 297, 298, 299, 384/300, 911, 908

[56] References Cited

U.S. PATENT DOCUMENTS

| | | | |
|---|---|---|---|
| 2,887,346 | 7/1957 | Gaugler. | |
| 3,011,219 | 12/1961 | Williams | 384/300 X |
| 3,131,978 | 5/1964 | White | 384/298 |
| 3,692,375 | 9/1972 | Matt et al. . | |
| 3,734,585 | 5/1973 | Conru | 384/298 |
| 4,084,863 | 4/1978 | Capelli | 384/300 |
| 4,107,381 | 8/1978 | Butzow et al. | 384/298 X |
| 4,137,618 | 2/1979 | Krauss | 384/300 X |
| 4,916,749 | 4/1990 | Urban et al. | 384/298 |
| 4,976,550 | 12/1990 | Shobert | 384/298 |
| 5,118,078 | 6/1992 | Reid . | |

*Primary Examiner*—Thomas R. Hannon

[57] ABSTRACT

A fabric lined bushing is formed by placing a braided liner around a mandrel coating the liner with an adhesive and injection molding an elastomeric bushing material around the adhesive coated braided liner. The braided liner is formed from polyester fibers and polytetrafluoroethylene fibers. Molding the elastomeric material under pressure around the braided liner while positioned on a mandrel tends to stretch the braided liner binding it more tightly to the mandrel and preventing the elastomeric material from penetrating the liner. The interior surface of the bushing is primarily the braided liner material which reduces noise and decreases wear.

5 Claims, 1 Drawing Sheet

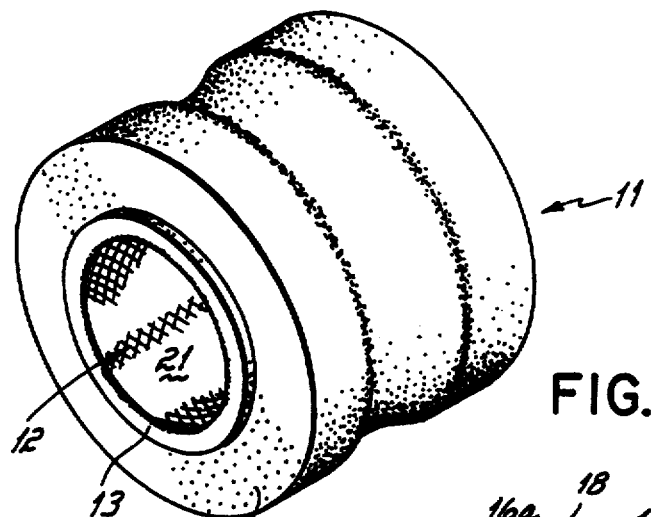
FIG. 1
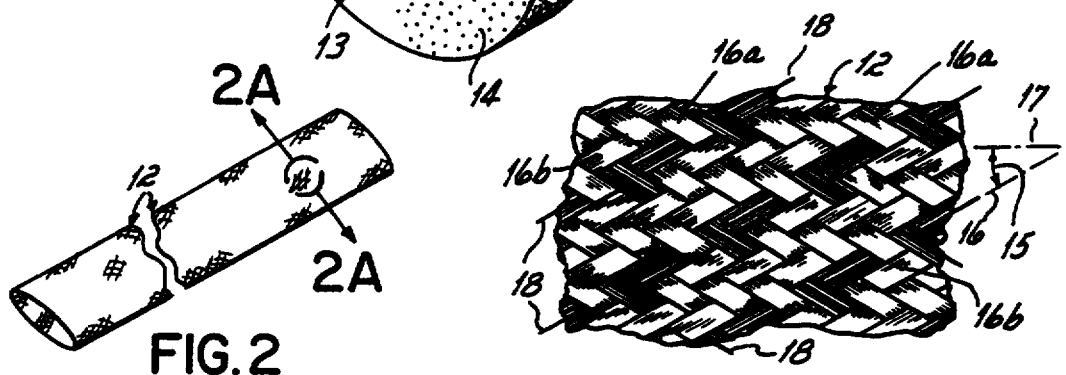
FIG. 2
FIG. 2A
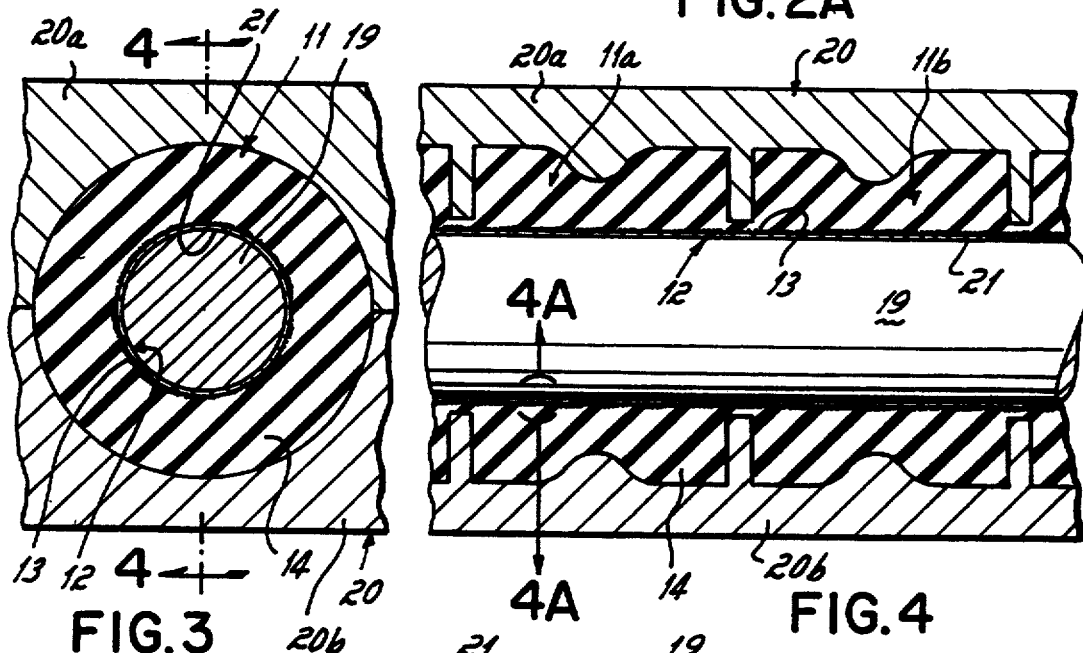
FIG. 3
FIG. 4
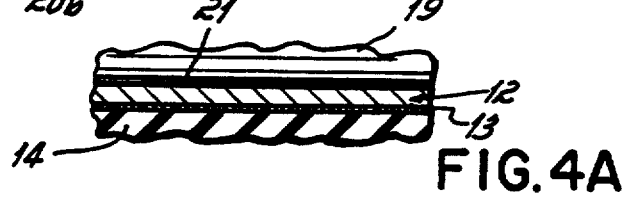
FIG. 4A

FABRIC LINED BUSHING

BACKGROUND OF THE INVENTION

Motor vehicles use a number of bushings to connect adjacent metal parts. The bushings allow relative movements of the metal parts and should prevent friction between the parts and, of course, reduce noise.

For example, the stabilizer bar is connected to the frame of a vehicle using a stabilizer bar bushing. These annular bushings are made of an elastomeric material such as SBR rubber. If formed solely from the elastomeric material, the movement of the stabilizer bar in the hollow core of the bushing would cause an undesirable noise. This is avoided by lining the internal surface of the bushing with a low friction material. In an attempt to eliminate the noise, a knitted fabric sleeve has been molded into the interior core or bore of the bushing to provide an interface between the stabilizer bar and the rubber support. During the molding process however, the elastomeric material can penetrate the liner. The bar rubbing against the elastomer produces an undesirable squeak.

Reid U.S. Pat. No. 5,118,071 discloses an attempt to overcome this. As disclosed in Reid, a solid Teflon TM sleeve is employed in place of the braided liner. Unfortunately this is not as strong as a fabric liner and it is more expensive and difficult to manufacture. Accordingly, there is a need to provide an elastomeric hollow bushing wherein the inner bore of the bushing is lined with a low friction material which prevents squeaking and wears well.

SUMMARY OF THE INVENTION

It is an object of the present invention to provide an elastomeric injection molded fabric lined bushing which does not permit elastomeric material to pass through the liner.

Further, it is an object of the present invention to provide such a bushing which is easy to manufacture and inexpensive. Further, it is an object of the present invention to provide such a liner which has the strength characteristics of a fabric lined bushing.

The objects and advantages of the present invention will be further appreciated in light of the following detailed description and drawings in which:

BRIEF DESCRIPTION OF THE FIGURES

FIG. 1 is a perspective view of a bushing made in accordance with the present invention;

FIG. 2 is a perspective view of a liner for use in the present invention;

FIG. 2A is an enlarged section of FIG. 2 taken at 2A—2A;

FIG. 3 is a cross-sectional view of a bushing being molded in accordance with the present invention;

FIG. 4 is a cross-sectional view taken at lines 4—4 of FIG. 3; and

FIG. 4A is an enlarged sectional view taken at 4A—4A of FIG.

DETAILED DESCRIPTION

As shown in FIG. 1, the present invention is a fabric lined bushing 11. The bushing includes a tubular liner 12 coated with an adhesive layer 13 in turn surrounded by an elastomeric material 14.

The liner 12 is a braided tubular liner material, i.e., the strands are wound about a cylinder in opposed directions with the strands intertwined. The braiding configuration permits the liner when stretched to radially constrict.

As shown in FIG. 2A, the leading angle 15 of the strands 16, that is the angle of the strands relative to the axis 17 of the cylindrical braided liner 12, can vary from 10° to 100° and is generally 30° to about 75°. With the preferred embodiment of the present invention, the lead angle is about 45° when the braided material is in an unstretched condition. With the lead angle defined, the relative angle of the left and right interwoven strands 16a and 16b is also defined. In the preferred embodiment, that angle is generally about 90°, but could vary from about 20° to about 180°. The liner itself must be a relatively dense liner. Generally the density of the liner should be from about 200 to 400 grams per square meter or more which will permit its use in the present invention.

The braided liner is formed from strands of a low friction material intertwined with strands of a bondable material. The bondable material can be any synthetic, resinous fiber other than a low friction material. These would include, for example, polyester fibers, polyamide fibers, polyolefin fibers and the like. These will form from about 40 to about 75% of the overall mass of the braided liner.

The strands of low friction material are preferably formed from fluorinated hydrocarbon fibers. Of course, there are a number of such compositions formed from ethylinically unsaturated fluorine containing monomers such as polytetrafluoroethylene, amylidine fluoride, chlorotrifluoroethylene, and hexafluoropropylene. Preferably the low friction fiber of the present invention will be formed from polytetrafluoroethylene commercially sold under the trademark Teflon TM.

Liners for use in the present invention are sold by Zens Manufacturing and Bentley Harris. A preferred liner is formed from three materials. The first is a polyester yarn having a denier of about 1800. This forms about 60% by weight of the liner. The second is an 11 mil pfa polytetrafluoroethylene monofilament (shown as 18 in FIG. 2A). And the third is about a 400 denier polytetrafluoroethylene (Teflon Brand) multifilament yarn. The overall density of this product is about 317 grams per square meter.

The elastomeric material 14 is bonded to the braided liner 12 by an adhesive 13. Any adhesive which is compatible with the strands of bondable material and the elastomeric material can be used. A preferred adhesive is a polyurethane or polyurethane polyester. Generally the preferred type of adhesive is a thermoset adhesive which is activated during the curing. One preferred adhesive is a thermoset polyurethane adhesive. This can be modified by adding 25% by volume of a rubber to metal adhesive such as Chemlok 250. This is basically an elastomer such as SBR dissolved in a solvent such as xylene. This acts as a compatibilizing agent.

| Material | Percent By Weight |
| --- | --- |
| Diphenylmethane Diisocyanate | 26.8 |
| Xylene | 21.7 |
| Methyl Ethyl Ketone | 19.0 |
| Trichloroethylene | 19.0 |
| Carbon Black | <2.7 |
| Inorganic Lead Salt | <1.1 |
| Methylene Bisphenyl Isocyanate | <0.8 |
| Carbon Tetrachloride | <0.02 |
| Balance Chemlok 250 | |

| Material | Percent By Weight |
|---|---|
| Components (Primarily SBR) | |

The final component of the present invention is a rubber bushing material. Any elastomeric material which is currently used for rubber bushing materials can be used in the present invention. These are generally low set and water resistant polymers. Preferred rubbers include SBR rubber, nitrile rubber, natural rubber, EPDM, and neoprene rubber.

One preferred formulation is disclosed below:

| Ingredients | % By Weight |
|---|---|
| 1606 SBR MB | 69.63 |
| Zinc Oxide | 1.29 |
| Stearic Acid | .64 |
| ARRD | .86 |
| N-330 Black | 7.31 |
| N-550 Black | 4.30 |
| Pliolite S-6HN | 1.72 |
| U.O.P. 688 | 1.29 |
| Sunolite 666 | .43 |
| 100 Mesh Ground RBR | 5.16 |
| Sundex 790 | 5.16 |
| Struktol W34 Flake | .86 |
| RM Sulfur O.T. | .75 |
| Santocure NS | .39 |
| TMTD | .21 |

To form the bushing of the present invention, the braided liner is preferably first coated with the adhesive dissolved in a solvent and the adhesive allowed to dry. Generally the liner 12 is simply dipped in the adhesive. Excess adhesive is removed, and the solvent evaporated leaving a thin film of the adhesive bonded to the surface of the liner. The adhesive coated liner can be stored for several weeks.

As shown in FIGS. 3 and 4, the coated liner 12 is then placed over rod or mandrel 19 and a mold 20 is placed around the coated braided liner. The mandrel 15 itself is precoated with a release agent (not shown) such as wax or can be coated with talc or the like. Likewise, the mold surfaces are coated with a release material. The heated two-piece mold 20a and 20b (see FIG. 4) is placed over the braided liner 12. In practice, the mold would form several bushing (11a and 11b shown), lined tip along the mandrel 19. The molds are then clamped.

The elastomeric material is preheated to 180° F. and injected under pressure into the mold. Generally the injection pressure will be about 15–30,000 psi, preferably 20,000 psi. The elastomeric material is cured by maintaining pressure and heat to a temperature of about 250° to 400° F., preferably 350° F. for about 2.5–10 minutes depending on the size of the bushing. This will also vary, of course, depending on the cure package as well as the particular rubber employed. For a two inch bushing, the cure cycle is about 5–5.5 minutes at 350° F. Upon curing, the mold sections are separated and the bushings are ready for use.

Due to the braided nature of the liner, when the elastomeric material is molded under pressure directly onto the adhesive coated braided liner, it tends to make the liner more taut and decreases the areas between the strands of the liner. This prevents the elastomeric material from penetrating the liner and covering the internal surface 21 of liner 12. Further, the same feature compensates for wrinkles in the liner surface. If a knitted liner is wrinkled when placed on the mandrel, the wrinkle remains. With the braided liner, the injection molding stretches the liner and removes the minor wrinkles from the surface.

These are all very important features in reducing noise from movement of a metal rod within the inner surface 21 of the bushing. With the metal rod contacting primarily the liner 12, and primarily the low friction portion of the liner, the friction is reduced and noise is reduced.

The preceding has been a description of the present invention along with the preferred method of practicing the present invention.

However, the invention itself should be defined only by the appended claims wherein we claim:

1. A fabric lined bushing comprising:
a braided liner formed from low friction fibers;
an adhesive layer coating an outer surface of said braided liner;
an elastomeric bushing material molded around and in contact with said adhesive layer of said braided liner wherein said braided liner prevents said elastomeric material from penetrating said braided liner.

2. The bushing claimed in claim 1 wherein said liner comprises 20 to 60% low friction material and 80 to 40% of a material selected from the group consisting of polyamide fibers, polyester fibers, and polyolefin fibers.

3. The bushing claimed in claim 2 wherein said low friction fibers comprise polytetrafluoroethylene fibers.

4. The bushing claimed in claim 4 wherein said adhesive comprises a thermoset polyurethane.

5. The bushing claimed in claim 4 wherein said adhesive includes an elastomeric compatabilizing agent.

* * * * *